US012668100B2

(12) United States Patent
Vartak et al.

(10) Patent No.: US 12,668,100 B2
(45) Date of Patent: Jun. 30, 2026

(54) VEHICLE REFRIGERANT SYSTEM USING HOT GAS BYPASS WITH VAPOR INJECTION

(71) Applicant: GM GLOBAL TECHNOLOGY OPERATIONS LLC, Detroit, MI (US)

(72) Inventors: Viraj Vartak, Ferndale, MI (US); Satish P. Ketkar, Troy, MI (US); Nathan John English, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 18/812,911

(22) Filed: Aug. 22, 2024

(65) Prior Publication Data

US 2026/0054545 A1     Feb. 26, 2026

(51) Int. Cl.
B60H 1/32          (2006.01)
B60H 1/00          (2006.01)

(52) U.S. Cl.
CPC ....... B60H 1/00885 (2013.01); B60H 1/3228 (2019.05); B60H 2001/3248 (2013.01); B60H 2001/3255 (2013.01)

(58) Field of Classification Search
CPC .............. B60H 1/00885; B60H 1/3228; B60H 2001/3248; B60H 2001/3255
See application file for complete search history.

(56) References Cited

U.S. PATENT DOCUMENTS

2011/0036104 A1*  2/2011  Toyoshima ............. F25B 45/00
                                                              62/149
2018/0003747 A1    1/2018  Choi

FOREIGN PATENT DOCUMENTS

DE        102013214267 A1    1/2015
DE        102020119813 A1 *  2/2022

OTHER PUBLICATIONS

Durrani, Refrigerant Circuit of Combined Refrigeration System, Feb. 3, 2022, DE102020119813A1; Whole Document (Year: 2022).*

* cited by examiner

*Primary Examiner* — Larry L Furdge
(74) *Attorney, Agent, or Firm* — Ingrassia Fisher & Lorenz, LLP | IF&L

(57)          ABSTRACT
A vapor injection refrigerant system includes a compressor including at least first and second stage inputs, and an output arranged to provide output vapor refrigerant. A condenser is fluidly coupled to the output of the compressor to receive the output vapor refrigerant, and an evaporator is fluidly coupled between the condenser and the first stage input. The evaporator is arranged to provide refrigerant in vapor to the first stage input of the compressor. A chiller is fluidly coupled between the condenser and both the first and second stage inputs. The chiller is arranged to inject refrigerant in vapor form into the first stage input or the second stage input. A bypass branch fluidly couples the output of the compressor to the first stage input of the compressor to provide at least some of the output vapor refrigerant to the first stage input without routing through the condenser, evaporator, and chiller.

20 Claims, 3 Drawing Sheets

VEHICLE REFRIGERANT SYSTEM USING HOT GAS BYPASS WITH VAPOR INJECTION

INTRODUCTION

The technical field generally relates to vehicles and, more specifically, to methods and systems for vehicle refrigerant systems that use hot gas bypass and vapor injection.

Many vehicles have climate-control systems to provide temperature control for the comfort of occupants in a cabin of the vehicle and to cool or heat the vehicle's components, such as batteries. Some of these climate-control systems include refrigerant systems having a compressor, a condenser, a chiller, and an evaporator for heating and cooling purposes. Such refrigerant systems, however, could be improved.

SUMMARY

In an example implementation, a vapor injection refrigerant system includes a compressor including at least a first stage input, a second stage input, and an output arranged to provide an output vapor refrigerant. A condenser is fluidly coupled to the output of the compressor to receive the output vapor refrigerant, and an evaporator is fluidly coupled between the condenser and the first stage input. The evaporator is arranged to provide refrigerant in vapor to the first stage input of the compressor. A chiller is fluidly coupled between the condenser and the first and second stage inputs. The chiller is arranged to inject refrigerant in vapor form into the first stage input or the second stage input. A bypass branch fluidly couples the output of the compressor to the first stage input of the compressor to provide at least some of the output vapor refrigerant to the first stage input without routing through the condenser, evaporator, and chiller.

Also in an example implementation, the bypass branch fluidly couples the output of the compressor to an outlet of the evaporator or an outlet of the chiller or both. The bypass branch is arranged to mix the output vapor refrigerant with refrigerant from the evaporator or chiller or both to form a first stage vapor provided to the first stage input of the compressor.

Also in an example implementation, the system includes at least one valve fluidly controlling the bypass branch to selectively mix the output vapor refrigerant in the bypass branch with the refrigerant from the evaporator, the chiller, or both.

Also in an example implementation, the system includes an accumulator at a merge of the bypass branch with a coupling to the chiller and a coupling to the evaporator.

Also in an example implementation, the system includes a heat exchanger coupled between the condenser and the second stage input of the compressor to provide injected vapor to the second stage input.

Also in an example implementation, the system includes at least one valve selectively coupling the chiller to the second stage input so that vapor originating from refrigerant from the chiller merges with vapor from the heat exchanger before entering the second stage input.

Also in an example implementation, the heat exchanger has an intermediate pressure side and a high pressure side, wherein the intermediate pressure side is coupled to the second stage input, and wherein the high pressure side is coupled to the chiller or the evaporator or both.

Also in an example implementation, the system includes an expansion control valve upstream from the intermediate pressure side and fluidly coupled to the condenser, and wherein the high pressure side is not fluidly coupled to an expansion control valve between an inlet of the heat exchanger and the condenser.

Also in an example implementation, the intermediate pressure side of the heat exchanger provides vapor at an intermediate pressure greater than a suction pressure at the first stage input and less than a pressure of the output vapor refrigerant at the output of the compressor.

Also in an example implementation, the high pressure side of the heat exchanger is coupled to the evaporator and the chiller to provide sub-cooled refrigerant to the evaporator or chiller or both.

In an example implementation, a vehicle includes a refrigerant system. The refrigerant system includes a compressor including at least a first stage input, a second stage input, and an output arranged to provide an output vapor refrigerant. A condenser is fluidly coupled to the output of the compressor to receive the output vapor refrigerant. An evaporator is fluidly coupled between the condenser and the first stage input. The evaporator is arranged to provide refrigerant in vapor form to the first stage input of the compressor. A chiller is fluidly coupled between the condenser and both the first and second stage inputs. The chiller is arranged to inject refrigerant in vapor form into the first stage input or the second stage input. An accumulator is fluidly coupled between the first stage input and both the chiller and the evaporator. A bypass branch fluidly couples the output of the compressor to the accumulator.

Also in an example implementation, the system includes a bypass ratio of the amount of bypass vapor to be passed through the bypass branch given an amount of refrigerant from the chiller to be heated by the bypass vapor, a bypass valve controlling flow of refrigerant through the bypass branch, and at least one processor communicatively coupled to the bypass valve and that uses the bypass ratio to control the bypass valve to control flow of refrigerant through the valve.

Also in an example implementation, the bypass ratio is set to attempt to provide a combined stream enthalpy state for the system that is as close to a saturated vapor state as possible. A combined stream extends from the accumulator to the first stage input.

Also in an example implementation, the system includes one or more sensors on the system arranged to detect temperature and pressure of the refrigerant in the system, a bypass valve along the bypass branch and coupled between the output of the compressor and the accumulator, and at least one processor communicatively coupled to the bypass valve and arranged to operate the bypass valve depending on a bypass ratio set by monitoring the one or more sensors.

Also in an example implementation, the system includes an outside heat exchanger with a forward mode during cooling operation. The heat exchanger operates as a condenser in forward mode and as an evaporator in a reverse mode. In the reverse mode, at least part of the bypass branch forms at least part of a fluid passage to the accumulator.

In an example implementation, a heating and cooling system on a vehicle includes a compressor including a first stage input, a second stage input, and an output arranged to provide an output vapor refrigerant. A condenser is fluidly coupled to the output of the compressor to receive the output vapor refrigerant. An evaporator is fluidly coupled between the condenser and the first stage input. The evaporator is arranged to provide refrigerant in vapor form to the first stage input of the compressor. A chiller is fluidly coupled between the condenser and the first stage input to provide a two-phase refrigerant. An accumulator is fluidly coupled between the first stage input and the chiller to receive the two-phase refrigerant. A bypass branch fluidly couples the output of the compressor to the accumulator to heat the two-phase refrigerant. A heat exchanger has an expansion control valve and is between the condenser and the second stage input to inject vapor into the second stage input at a first pressure higher than a second pressure of vapor entering the first stage input.

Also in an example implementation, the heat exchanger is fluidly positioned between the condenser and the chiller to divert refrigerant to the second stage input and away from the chiller.

Also in an example implementation, the system includes a pressure and temperature sensor coupled between the first stage input and the accumulator. At least one processor receives signals from the sensor and is used to determine an amount of refrigerant to flow through the bypass branch.

Also in an example implementation, an outside heat exchanger connected between the compressor output and the accumulator in a reverse mode, wherein the outside heat exchanger is arranged to receive ambient air external to the vehicle as the heat source in the reverse mode.

Also in an example implementation, the heat exchanger includes a first pressure side generating vapor of the first pressure and adjacent a third pressure side of the heat exchanger that receives liquid of a third pressure from the condenser. A shut-off valve is between the first pressure side and the condenser, and is available to selectively block refrigerant flow to the first pressure side without blocking refrigerant flow to the third pressure side.

DESCRIPTION OF THE DRAWINGS

The present disclosure will hereinafter be described in conjunction with the following drawing figures, where like numerals denote like elements and the drawings are not to scale, and where.

DETAILED DESCRIPTION

Figure 1:
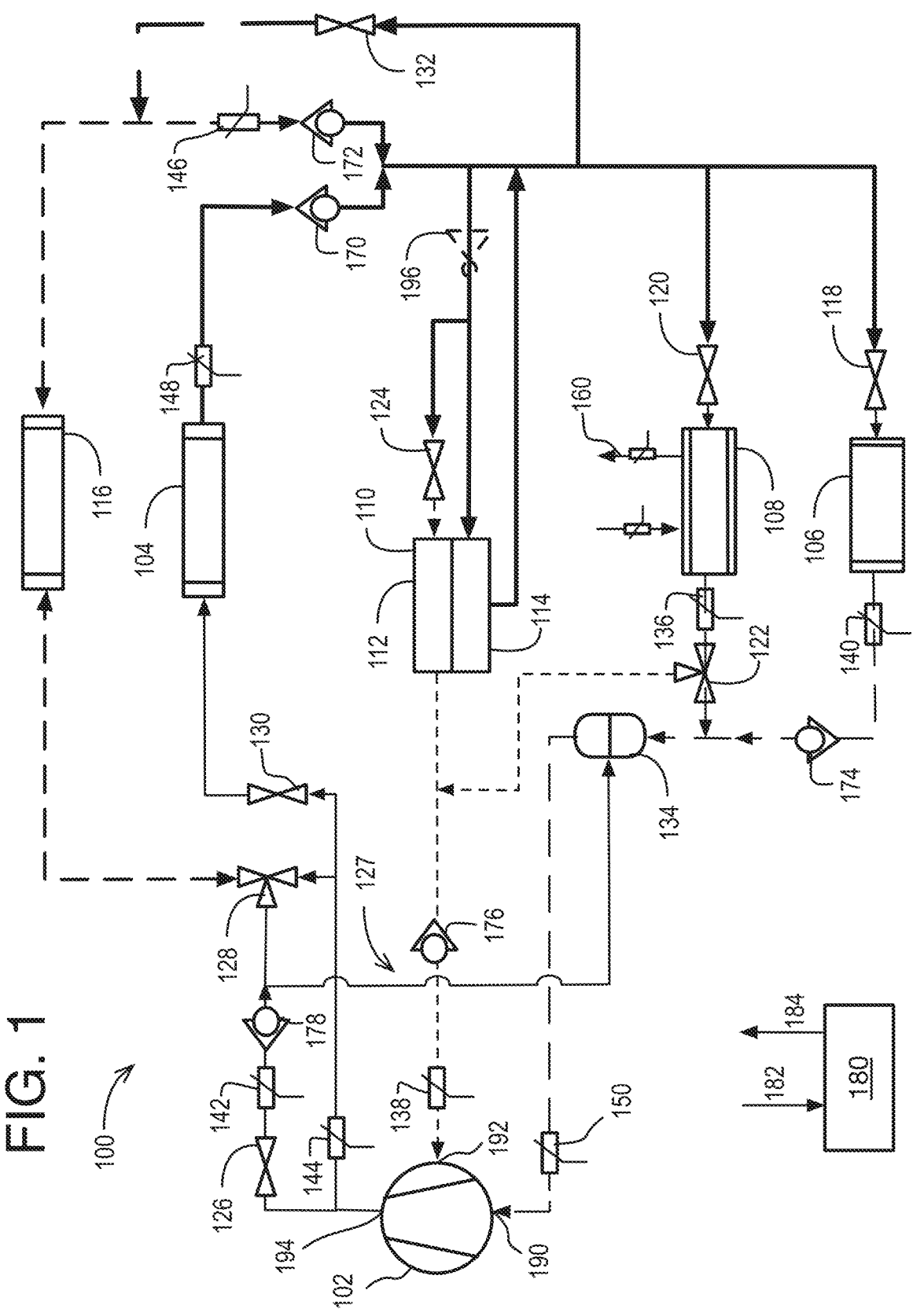
FIG. 1 is a schematic diagram of an example refrigerant system of a vehicle according to at least one of the implementations herein.

The following detailed description merely describes example implementations and are not intended to limit the disclosure or the application and uses thereof. Furthermore, no intention exists to be bound by any theory presented in the preceding background or the following detailed description.

Vehicles may include refrigerant systems for heating and cooling. This may involve a compressor that provides hot refrigerant at high pressure in a gas or vapor phase to a condenser that converts the vapor into a liquid phase. The liquid is then provided to a chiller, heat exchanger, and/or evaporator to heat or cool a cabin in the vehicle and/or components of the vehicle such as a battery, for example. The liquid then may be converted into a two-phase mixture with heated vapor by using an expansion control valve. Alternatively, a flash tank or an expansion control valve with a gas separation chamber can be used. This is done before refrigerant is returned to the compressor for efficient compression. Such systems, however, still depend on external high voltage heaters on electric vehicles and/or waste heat from coolants, combustion engines, or other heat sources on the vehicle to sufficiently heat the refrigerant, and in turn heat or cool the thermal load, such as the vehicle cabin and/or battery.

To reduce such dependence, the vehicles and refrigerant systems disclosed herein use a hot gas (or vapor) bypass branch from the output (or outlet) of the compressor back to an input (or port or inlet) of the compressor to provide heat without depending on external heating sources, and while bypassing the other components of the refrigerant systems, such as the condenser, chiller, evaporator, and so forth. The vapor from the bypass branch mixes with vapor-liquid (two-phase) mixtures output from the other components to heat and further vaporize the mixtures before being suctioned into the compressor as saturated vapor. This arrangement creates a self-sufficient refrigerant system.

However, it is difficult to balance between (1) the amount of refrigerant output from the compressor and diverted into the bypass branch, and (2) the amount of refrigerant output from the compressor and permitted to flow to the other components of the system, such as the condenser, chiller, and evaporator, to provide a sufficient amount of refrigerant to the chiller. Specifically, due to the low enthalpy state (or low energy) of the output vapor-liquid mix from the chiller during a heating mode, it takes a larger proportion of bypassing hot vapor to adequately heat a smaller amount of the mix (or two-phase refrigerant) form the chiller that is to be provided to the primary suction port of the compressor. This in turn makes the system inefficient because the higher bypass ratio results in less refrigerant to the components such that the system does not adequately heat a target thermal load. Also, the relatively large mass of refrigerant in the bypass refrigerant system requires a greater compression speed, and in turn more energy to run the compressor.

To provide a more efficient refrigerant system, the disclosed vehicles, systems, and methods include a vapor injection refrigerant system combined with a hot gas bypass. In the disclosed system, refrigerant in vapor form is pulled from an expansion side of the system where expansion control valves lower refrigerant pressure and convert liquid refrigerant into a two-phase mixture which is then converted to vapor by mixing with a bypassed refrigerant, and then in a compression side of the system, the vapor is injected into at least two ports (or inputs) on a two-stage vapor injection compressor. In this manner, vapor at intermediate pressure is pulled from a vapor injection heat exchanger in the system, and from expansion valves of the chiller depending on a current mode (or the type of thermal load) of the system. The evaporator provides vapor at a lower pressure. Thus, the outlet sides of the chiller, the evaporator, and the vapor injection heat exchanger provide vapor at two different pressures where the vapor from the evaporator is input at a first stage of the compressor at a primary compression suction port and at a lower pressure. The vapor from the vapor injection heat exchanger is fed to a second stage or intermediate stage at an intermediate pressure port of the compressor. The vapor from the chiller can be input to either port, depending on the current mode of the system. This arrangement of multiple ports increases the refrigerant mass placed into the compressor at a single time while reducing the amount of refrigerant that flows to the chiller due to the presence of the vapor injection heat exchanger providing a portion of the refrigerant to the second stage port of the compressor. Since the chiller has less refrigerant, less bypass vapor is needed to heat the vapor refrigerant from the chiller, thereby resulting in a more efficient amount of refrigerant being provided to the chiller. This higher efficiency permits the system to operate with a lower total amount of refrigerant in the system, which in turn permits the compressor to operate at lower speed to save more energy, or enables a greater refrigerant mass flow rate (or more refrigerant) at the same compressor speed when desired.

Referring now to FIG. 1, an example vapor injection and hot gas bypass refrigerant system 100 (also referred to as a heating and cooling device or system) includes a multistage compressor 102 having at least first and second stages, a heating condenser 104 coupled to the compressor 102, an outside heat exchanger (OHX) 116 coupled to the compressor 102, an evaporator 106 coupled to both the heating condenser 104 and the OHX 116, a chiller 108 coupled to both the heating condenser 104 and the OHX 116, and a vapor injection heat exchanger (VIHE) 110 (also referred to as an internal heat exchanger (IHX)) coupled to both the heating condenser 104 and the OHX 116. The heat exchanger 116 will be referred to as the OHX 116 to better differentiate with heat exchanger or VIHE 110, and the OHX 116 is capable of functioning as both a condenser and an evaporator depending on the direction of flow through the OHX. These components are interconnected through lines that may be referred to as hoses, pipes, tubes, and/or conduits, and these terms may be used interchangeably unless particular properties of the lines are mentioned. The lines may have check valves 170, 172, 174, 176, and 178 to prevent or limit unwanted reverse flow, and may be placed on the lines as desired or found to be efficient and/or effective.

During operation, the compressor 102 outputs refrigerant in a high pressure, high temperature vapor form for circulation in a refrigerant loop. For example, the compressor 102 provides pressurized vapor to an inlet of both the heating condenser 104 and/or the OHX 116, which both condense the vapor into a liquid (e.g., refrigerant in liquid form). In doing so, heat is released and transferred to a surrounding environment to provide heat to a vehicle cabin in a cabin heating mode for example. The refrigerant now in liquid form then passes from outlets of the condenser 104 and/or OHX 116 to inlets of the evaporator 106, the chiller 108, and the heat exchanger 110 through suction of the compressor 102.

As shown in FIG. 1, thicker lines interconnecting the heating and cooling components mentioned indicate liquid flow, while thinner lines indicate gas or vapor flow. Also, short dashes indicate vapor flow to the second stage of the compressor 102, while longest dashes indicate vapor flow to the first stage of the compressor 102. The medium dashes indicate alternative forward and reverse flow through the OHX, where regardless of direction, flow in the line on the compressor side of the OHX 116 is in vapor form, and flow in the line on the opposite side of the OHX 116 from the compressor is in liquid form.

Also as shown in FIG. 1, the refrigerant in liquid form may pass through valves 118, 120, and 124 respectively before arriving at the inlets of the evaporator 106, the chiller 108, and the heat exchanger 110. The valves 118, 120, and 124 may be expansion control valves, such as electronic expansion valves (EXVs) that reduce the pressure of the liquid and exits the valves as a vapor-liquid mix (a two-phase refrigerant). The evaporator 106 then evaporates the refrigerant still in liquid form (from the condenser 104 and/or OHX 116) into vapor form. The vapor then passes from an outlet of the evaporator 106 to a first stage port 190

(or input or inlet) of the compressor 102 through suction of the compressor 102. The chiller 108 functions in a similar manner as the evaporator 106, but refrigerant from the chiller 108 may be injected into the first stage port 190 during a heating mode or battery cooling mode, while the refrigerant from the chiller 108 may be entirely or partially injected into a second stage port 192 (or input or inlet) through suction of the compressor 102 during a cabin cooling mode for example. Thus, when desired in this example, refrigerant from the chiller 108 may be injected into the second stage of the compressor 102 by routing of the chiller's outlet to the second stage of the compressor through a three-way flow valve. Other options are provided as discussed below by using a three-way valve 122. Thus, the valve 122 can direct the vapor from the chiller 108 either to the first stage port 190 or to the intermediate pressure stage port 192. It will be appreciated that the first stage port 190 may be referred to as a low (or lower) pressure primary suction port, while the second stage port 192 may be referred to as an intermediate pressure stage port (or just intermediate pressure port). An outlet 194 of the compressor 102 may be referred to as an output.

In various implementations, expansion of the vapor refrigerant injected into the first and second stages of the compressor 102 from the evaporator 106, chiller 108, and VIHE 110 may be controlled. For example, a controller 180 may control the valves 118, 120, and 124 coupled between the outlets of the condenser 104 and the OHX 116 on one end, and the inlets of the evaporator 106, chiller 108, and VIHE 110 to control expansion. In such examples, when the valve 120 is an EXV, the controller 180 may control the valve 120 to adjust a flow of refrigerant in liquid form provided to the chiller 108. For instance, the valve 120 may be controlled to be fully open, restricted, or closed to set the amount of pressure of the liquid. This is the same for valves 118 and 124 for the evaporator 106 and heat exchanger 110, respectively.

The controller 180 may be formed of, or may have, controller circuitry that includes processor circuitry that forms, or operates, at least one processor, components, modules, units, and so forth whether formed of hardware, firmware, and/or software to operate the controller to control the refrigerant system 100 described herein. Further description of the components of the available controller 180 are provided below.

In some examples, the valves 118, 120, and 124 may be controlled based on one or more inputs received by the controller 180 from one or more sensors in the system 100. For example, the valves 118, 120, and 124 may be controlled respectively based (at least in part) on a sensor 140, 136, and 138 respectively coupled between the evaporator 106, chiller 108, or heat exchanger 110 and the compressor 102. Sensors may be provided throughout system 100 to provide input 182 to controller 180 so that the controller 180 can send control signals 184 to various valves. The controller 180 also may receive setpoints (e.g., target values). The input signals 182 may represent, for example, temperature and/or pressure values in the system 100. Thus, in addition to sensors 136, 138, and 140 to control the expansion valves 118, 120, and 124, additional sensors 142, 144, 146, 148, and 150 may be provided to control valves on system 100 or to monitor the general status of system 100 as explained in greater detail below. In various implementations, the sensors may be pressure and/or temperature sensors or another suitable type of sensor.

With regard to operation of the chiller 108, the expansion valve 120 expands (lowers the pressure) and cools the high pressure, high temperature liquid refrigerant received from the condenser 104 and/or OHX 116 creating a vapor-liquid mix (a two-phase refrigerant). The chiller 108 then heats the refrigerant to form more vapor in the mix, but may not completely remove all of the liquid from the mix so that a two-phase mix is still output from the chiller. For example, the chiller 108 may be employed to cool a battery, such as a high voltage, rechargeable battery in a vehicle. For instance, the chiller 108 is coupled to a heat exchanger or another suitable thermal device (not shown) via a coolant loop 160. The chiller 108 passes coolant through the coolant loop 160 and to the heat exchanger, which is then used to cool a battery associated with the heat exchanger. The now warmer or hot coolant is then returned to the chiller 108 via the coolant loop to be re-chilled. The refrigerant passes in thermal contact with the coolant to heat the refrigerant and form more vapor in the mix. Thus, in such examples, the heating of the vapor refrigerant injected into the first or second stage of the compressor 102 (depending on the mode of the system) may be controlled based on, for example, a heat transfer load associated with the chiller 108 for cooling the battery. By one approach, a coolant loop valve (not shown) may be placed on the coolant loop 160 and controlled by the controller 180 to adjust a flow of coolant provided to the coolant loop heat exchanger. When the coolant loop valve is partially restricted or closed, the coolant loop valve can be used to control a saturation temperature and/or heat transfer load associated with the chiller 108 at target values.

In various implementations, the system 100 may include the three-way valve 122 coupled between the outlet of the chiller 108 on one side and either or both the first stage port 190 and the second stage port 192 on the other sides (or outlets) of the valve 122. Generally, when the system 100 is in a battery cooling mode or a cabin heating mode when the chiller is being used, the valve 122 is set to provide the vapor from the chiller 108 to the first stage port 190.

In detail for the battery cooling mode or the cabin heating mode (and/or other modes), the valve 122 may have a first outlet coupled to the first stage port 190 so that the valve 122 may be set to provide all or a portion of the vapor from the chiller 108 to the first stage port 190. This also results in coupling the first outlet of the valve 122 to the evaporator 106 and a hot gas bypass (HGB) 127 as described below (also referred to as a bypass line or fluid passage). Thus, the two-phase mix from the chiller 108 mixes with vapor from the evaporator, when present, and is heated by the vapor from the bypass branch 127 to vaporize remaining liquid in the two-phase vapor from the chiller 108 and to thereby provide saturated or superheated vapor from the chiller 108 to the first stage port 190. Otherwise, the three-way valve 122 may be operable in different states to fully block refrigerant flow from the chiller 108 to mix the evaporator vapor with the bypass vapor alone.

During these modes, the VIHE 110 is separately injecting vapor into the second stage port 192 of the compressor 102, also explained in detail below. When the bypass branch 127 is used in these modes as mentioned above, less refrigerant flows to the chiller 108 and therefore less bypass vapor is needed, which in turn reduces the total amount of refrigerant (or refrigerant mass) that is needed by the system 100.

During a cabin cooling mode (and/or other modes) of the system 100, the valve 122 may be set to provide all (or some portion of) vapor flow from the chiller 108 to the second stage port 192, and in this case, the evaporator 106 and the chiller 108 may be operated at different pressures, thereby allowing for different saturation pressures and/or temperatures in the evaporator 106 and the chiller 108. For example, the evaporator 106 and the chiller 108 respectively may output refrigerant in vapor form and/or two-phase refrigerant form at different pressures to the first and second stage ports 190 and 192 of the compressor 102. In such examples, the refrigerant provided by the chiller 108 may be output at a greater pressure than the vapor provided by the evaporator 106. By having the outlets of the chiller 108 and evaporator 106 (which may be at different pressures) separate and not merged as in traditional vapor compression systems, the system 100 benefits from the pressure differentials between the two decoupled loops and the second stage available in the compressor.

In more detail, during cabin cooling and battery cooling mode, when the refrigerant of the chiller 108 is to be provided to the second stage port 192, the refrigerant from the chiller 108 is injected into the second stage port 192 of the compressor 102 through the valve 122. Since the refrigerant from the chiller 108 is either saturated or superheat vapor, the valve 122 directs the flow of refrigerant into the second stage port 192. The vapor from the chiller 108 then mixes with the vapor from the VIHE 110.

Also, the valve 122 may be a variable refrigerant flow valve (RFV) so that the controller 180 may control the valve 122 to adjust a flow of refrigerant to direct a particular portion of the refrigerant or vapor from the chiller 108 in any of the system modes and to the first stage port 190 and/or to be injected into the second stage port 192. With such a configuration, the valve 122 may be employed to at least partially control (via the controller 180) the mass flow at the second stage and second stage port 192 of the compressor 102 as mentioned. In various implementations, control of the valve 122 may be in part based on the sensor 138 coupled between the valve 122 and the second stage port 192 of the compressor 102. For instance, the controller 180 may control the valve 122 to inject refrigerant in vapor form into the second stage port 192 of the compressor 102 at a pressure greater than a pressure of the first (or primary) stage port 190 of the compressor 102. In this manner, the vapor pressure in the second stage of the compressor 102 may be significantly increased. By one option, the chiller 108 may provide all of the vapor injection, but in other implementations herein, the vapor from the chiller 108 mixes with the vapor from the VIHE 110 and may match the intermediate pressure of the vapor from the VIHE 110.

With this arrangement, the controller 180 may control valve 122 and any of the valves on system 100 to achieve desired results when a valve has expansion capabilities. In such examples, the controller 180 may control one or more of the valves to ensure a saturation temperature, superheat, and/or heat transfer load associated with the chiller 108, or any of the other components, and/or a pressure at the second stage port 192 of the compressor 102 to meet target values. For example, the controller 180 can control the three-way valve 122 (via the output signals 184) to operate in any of these modes. In such examples, the valve 122 may restrict vapor flow to the lower-pressure port 190 and be more open to the higher-pressure port 192, or any other desired combination.

With regard to the heat exchanger (VIHE) 110, the heat exchanger 110 is provided to both provide intermediate pressure vapor to inject into the second stage port 192 while also further sub-cooling a portion of the refrigerant to provide to the chiller 108 and/or evaporator 106 to further raise the efficiency of the chiller 108 and evaporator 106, as well as the entire system 100 by reducing a required amount of refrigerant of the system as explained above. Specifically, the heat exchanger 110 has an intermediate pressure side 112 and a high pressure side 114. The two sides 112 and 114 have a shared wall or other thermal transfer mechanism to transfer heat between them. The inlet of the intermediate pressure side 112 is coupled to the expansion valve 124 that converts the high pressure, high temperature liquid refrigerant to a two-phase refrigerant of liquid and vapor with lowered pressure. The expansion valve 124 reduces the pressure of the received refrigerant to the intermediate pressure, and creates two-phase refrigerant, to be provided to the VIHE 110 to then provide more vapor refrigerant to inject into the second stage port 192. So arranged, when the intermediate pressure side converts more of the liquid to vapor due to the heat from the high pressure side, the conversion provides vapor at the intermediate pressure that can be directed to the second stage port 192 of the compressor. This also further increases the mass flow rate at the compressor.

The high pressure side 114 receives liquid high pressure refrigerant from the condenser 104 and/or OHX 116 without expansion. The release of heat from the high pressure side 114 to the intermediate pressure side 112 cools (or sub-cools) the liquid before being directed to the chiller 108 and evaporator 106.

The compressor 102 may be a number of different types of compressors and by one form is a two-stage scroll compressor. By one example form, the compressor 102 may suction vapor at the first stage port 190 at a pressure of about 300 kPa, may receive injected vapor at the second stage port 192 at a pressure of about 500-600 kPa, and may output high pressure vapor at 1500 kPa.

The compressor 102 provides pressurized vapor to the condenser 104 via a valve (e.g., a variable RFV) 130 and to the OHX 116 via a valve (e.g., a variable RFV) 128. In such examples, the OHX 116 functions as a condenser. The refrigerant (in liquid form) from the condenser 104 and the OHX 116 then passes to the heat exchanger 110 or directly to the evaporator 106 and chiller 108 (via the expansion valves 118, 120) as explained above. The sub-cooled refrigerant from the heat exchanger 110 moves to the chiller 108 and evaporator 106 as well. The evaporator 106 provides the refrigerant to an accumulator 134, and the chiller 108 provides to the accumulator 134 and/or the second stage port 192 of the compressor 102 based on control of the valve 122 as explained above. The vapor refrigerant collected by the accumulator 134 is suctioned to the first stage port 190 of the compressor 102. As such, when the chiller 108 provides vapor directly to the second stage port 192, that vapor bypasses the accumulator 134 to avoid high pressure drops.

In an implementation, a reverse flow mode may be provided when it is desirable to use the OHX 116 as an evaporator rather than a condenser. This may occur when the OHX 116 is to be used for cabin heating. When the OHX 116 is functioning as an evaporator in the reverse mode, the refrigerant flow is reversed with respect to the OHX 116 as indicated by the medium-length dashed lines. For example, the OHX 116 receives the refrigerant (in liquid form) from the condenser 104 and the heat exchanger 110, when being used, via a valve (e.g., a variable EXV) 132. The refrigerant (in vapor form) at the OHX then passes to the accumulator 134 via a three-way valve (e.g., a variable RFV) 128. In various implementations, the valve 128 may be divided into two separate devices, one for each flow direction forward or reverse).

Also in the reverse mode, the refrigerant from the OHX 116, acting as an evaporator, will be heated to form a vapor closer to the vapor saturation level, and will have lower pressure than the intermediate pressure vapor for the second stage port 192. The OHX vapor will mix in the accumulator 134 with vapor from the evaporator 106 and the chiller 108, if provided, before being suctioned into the first stage port 190 of the compressor 102. The chiller 108 and/or evaporator 106 may or may not be operating depending on which system mode is being used. The VIHE 110 is expected to operate for any reverse flow mode, but may be shut off when desired.

To accomplish the mixing mentioned above, the accumulator 134 is coupled to the outlet of the evaporator 106, one of the outlets of the three-way valve 122 to the chiller 108, and the three-way valve 128 for reverse flow which may use a line coupling to the accumulator 134 that is shared as part of the hot gas bypass (HGB) 127 (or just bypass branch 127). The accumulator 134 also may function as a storage tank to hold refrigerant (in vapor form or two-phase form being converted into saturated or superheated vapor form) for the evaporator 106 and the chiller 108. The accumulator 134 may include a filter (not shown) to capture undesirable particles and/or remove moisture from the refrigerant.

Particularly, the bypass branch 127 includes a hot gas bypass valve (HGBV) valve 126 coupled between the outlet of the compressor 102 and the reverse flow RFV valve 128. The HGBV valve 126 may be open to direct refrigerant to the accumulator 134, and by one form, merges with the line from the valve 128 and connects to the accumulator 134 to provide the reverse flow from the OHX 116 and/or from the bypass valve 126. By another alternative, the bypass branch 127 may have a separate line. With this arrangement, the bypass branch 127 acts similarly to a heat pump to provide higher temperature vapor to the compressor's first stage port 190, and specifically by mixing with the two-phase refrigerant from the chiller 108, and optionally the cooler vapor refrigerant from the evaporator 106, to vaporize remaining liquid in the accumulator 134 and increase the temperature of the vapor before being suctioned to the first stage port 190.

In a bypass mode, the system 100 is in a forward flow arrangement, where the valve 128 may have a reverse flow outlet coupled to the bypass branch 127 that is closed. When the bypass valve 126 is open, this permits vapor refrigerant from the compressor outlet to flow to the accumulator 134. Otherwise, the non-bypass refrigerant not diverted through bypass valve 126 and on the bypass branch 127 may flow to the condenser 104 via valve 130. The operation of the components (the condenser 104, the OHX 116, the chiller 108, the heat exchanger 110, and the evaporator 106) may operate as already described above.

Also with this arrangement, the controller 180 may be used to open, close, or otherwise throttle (or modulate) the bypass valve 126 to precisely control and balance the ratio or amount of refrigerant to be routed back to the compressor 102 through bypass branch 127 versus the amount of refrigerant to provide to the condenser 104, and/or the OHX 116, and in turn the heat exchanger 110, the chiller 108, and/or the evaporator 106. The balance should be determined so that a combined stream enthalpy state of the system is as close to the saturated vapor as possible. 'Enthalpy state' herein refers to a representation of a refrigerant state with regard to specific enthalpy or energy content (such as Kilojoules per Kilogram for example), and indicates a phase of the refrigerant relative to a liquid-vapor phase change saturation curve using the property 'Enthalpy.' Saturated vapor as used herein indicates the refrigerant state or phase at (or substantially at) 100% vapor at the phase change temperature.

Thus, a bypass balance or bypass ratio can be attained by adjusting the flow of the bypass branch 127 and non-bypass flow to the condenser 104 and/or OHX 116, and in turn particularly to the chiller 108 until the combined stream enthalpy state is as close to the saturated vapor as possible. The actual enthalpy state can be determined by using the sensor 150 between the first stage port 190 and the accumulator 134 to monitor the combined stream or line between the accumulator 134 and the first stage port 190. The sensor 150 may be, or have, both a pressure and temperature sensor. At this location of sensor 150, the high pressure, high temperature vapor refrigerant from the bypass branch 127 and the two-phase refrigerant from the chiller 108 has already been combined into a single stream. As an alternative, the combined stream enthalpy state can be estimated by estimating the enthalpy of refrigerant at the chiller outlet and modulating the vapor refrigerant in the bypass branch 127 by controlling bypass valve 126 such that the combined stream enthalpy after mixing is above saturated vapor (superheated vapor). Otherwise, precise bypass ratios may be predetermined by experimentation and subsequently used at the controller.

As mentioned, the bypass requires less refrigerant because of the presence of the vapor injection at the intermediate stage port 192 to provide more refrigerant mass and greater mass flow rate from the VIHE 110 rather than the chiller 108. Thus, with too much bypass refrigerant, the other components (the OHX 116, the condenser 104, heat exchanger 110, chiller 108, and/or evaporator 106) will be too inefficient and will not provide enough cooling or heating to satisfy the thermal loads.

By another alternative approach, an ambient heat recovery (AHR) mode may use ambient air (such as cool or cold air outside of the vehicle in cold climates) as a heat source for the OHX 116 when operated in an evaporation mode (or reverse mode) and to generate vapor at a target temperature and pressure (or closer to the target temperature and pressure) to be fed into the first stage port 190 of the compressor 102.

Also in the AHR mode, the refrigerant is fed into the OHX 116 at a pressure lower than the saturation pressure corresponding to the ambient temperature. Thus, for example, at an ambient temperature of 0° C., the saturation pressure is about 300 kPa. In this case, the refrigerant is fed to the OHX 116 at a pressure below saturation pressure corresponding to ambient temperature. The lower the pressure that is fed to the OHX, the lower the density of the refrigerant being suctioned into the compressor 102 at the first stage main suction port 190. With the use of the bypass branch 127 in this case, the compressor 102 can be operated at a slightly higher pressure. However, the refrigerant may not be completely evaporated at the OHX 116, which may need to be further evaporated by the hot vapor from the bypass branch 127 when combined at the accumulator 134. This approach allows the system to harness freely available ambient heat while increasing the suction pressure by utilizing the hot gas bypass branch, while reducing the amount being bypassed.

As yet another option, the heat exchanger 110 may have a shut-off valve 196 coupled between the expansion valve 124 and the condenser 104 and OHX 116. The shut-off valve 196 may be positioned to entirely close-off the heat exchanger 110. This may be used when mass flow for vapor injection from the heat exchanger is not needed.

Figure 2:
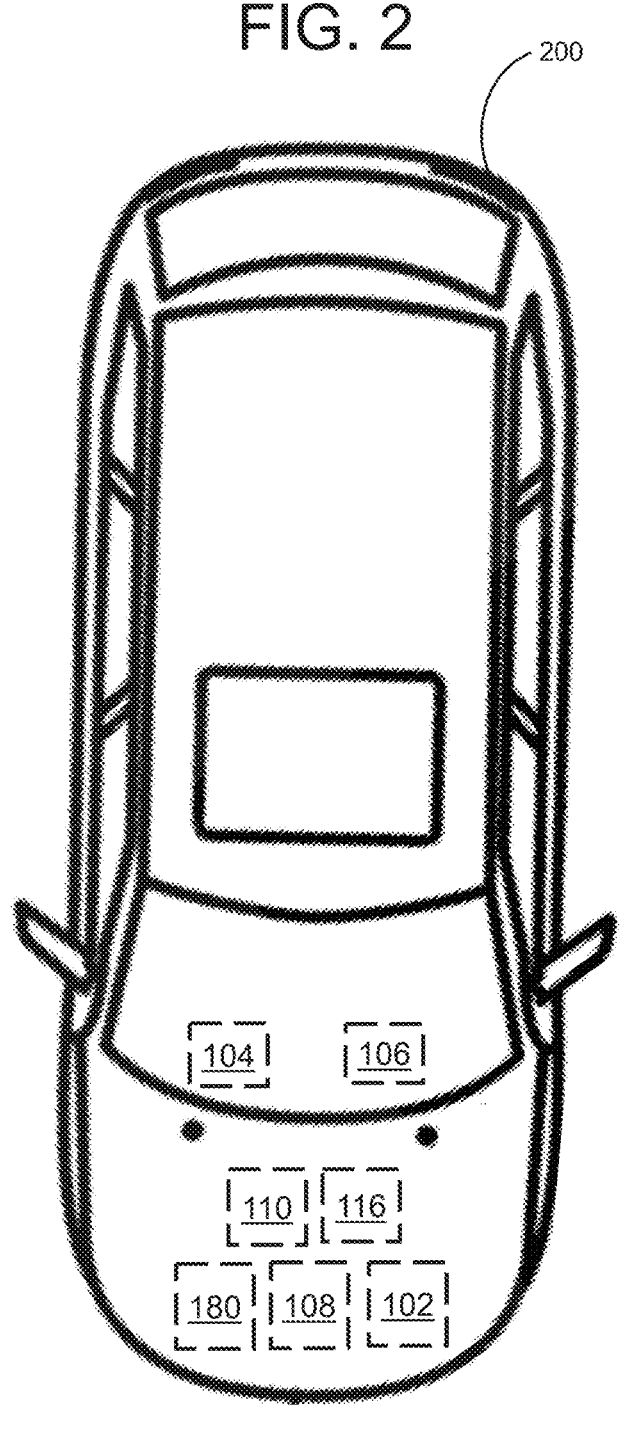
FIG. 2 is a schematic diagram of a vehicle including a vapor injection refrigerant system according to at least one of the implementations herein.

Referring to FIG. 2, the refrigerant systems herein and/or components thereof may be employed in a vehicle 200 for heating and cooling purposes. The vehicle 200 includes portions of the system 100. Specifically, the vehicle 200 includes the compressor 102, the condenser (e.g., a cabin condenser) 104, the evaporator 106, the chiller 108, the controller 180, and the outside heat exchanger (OHX) 116 as well as heat exchanger 110. Although not shown, the vehicle 200 may include the valve 122 coupled downstream of the chiller 108, the HGBV valve 126, and the reverse flow valve 128, as well as the other valves and components mentioned above. Although the vehicle 200 is shown as including portions of the system 100, it should be appreciated that the vehicle 200 may include additional suitable vapor injection refrigerant systems or components.

Figure 3:
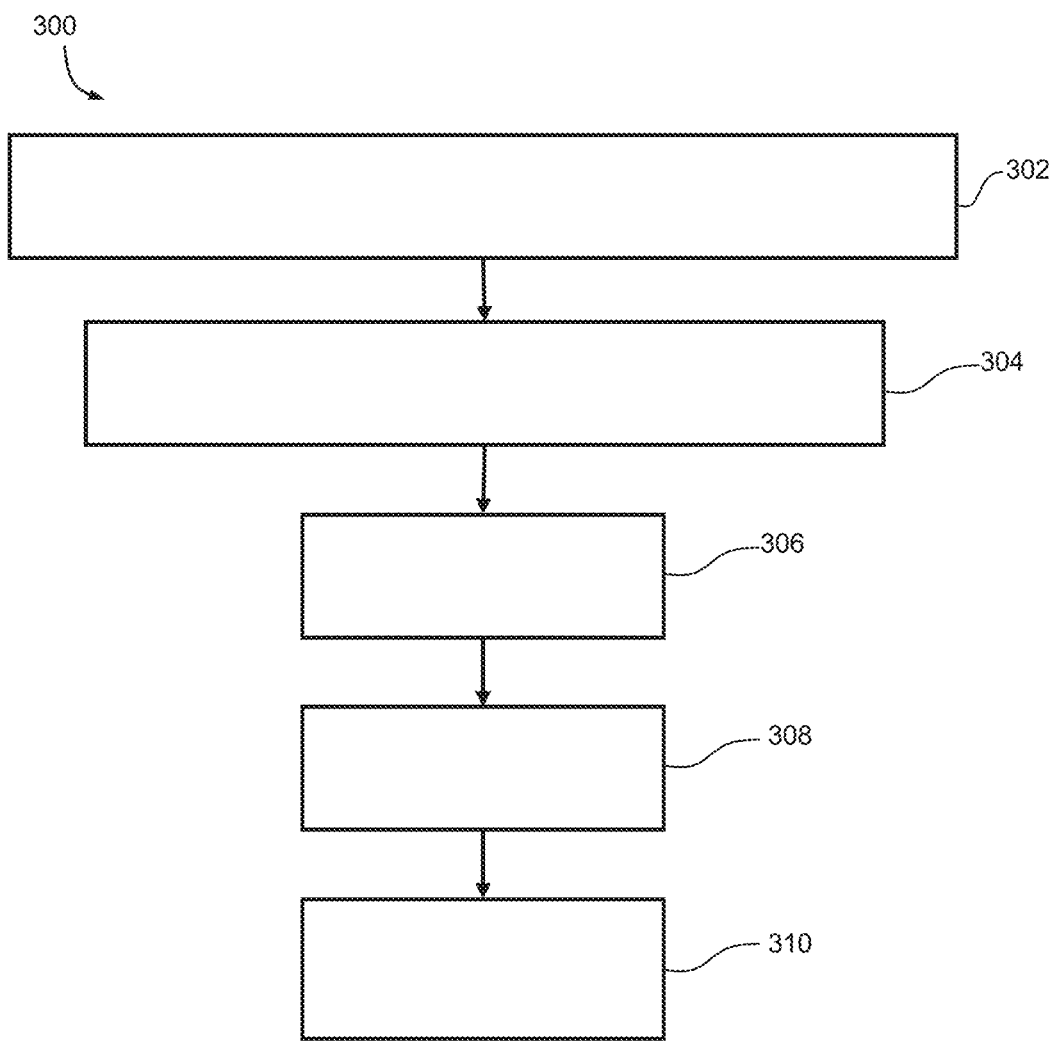
FIG. 3 is a flowchart of an example process for operating a vapor injection refrigerant system according to at least one of the implementations herein.

Referring to FIG. 3, a method of operating a refrigerant system for a vehicle is described in accordance with at least one of the implementations herein, and with operations 302 to 310 numbered evenly. The system 100 and vehicle 200 of FIGS. 1-2 may be referred to while describing the process 300, and where relevant.

As a preliminary matter, the controller 180 may be started when the system is powered-on and/or at another suitable time.

Process 300 may include "receive, by processor circuitry forming at least one processor, a control mode" 302, and where, by one example, the at least one processor operates, or is, the controller 180 described above. For example, the control mode may be based on user input (e.g., from a driver, a passenger, etc.) in a vehicle, settings associated with the system, sensed parameters (e.g., a temperature of a battery, etc.) associated with the system, etc. In various implementations, the control mode may include example modes such as a cabin cooling mode with or without reheat, a cabin cooling mode with high load battery cooling, a cabin cooling mode with low load battery cooling, a battery cooling mode, a cabin heating mode with temperatures less than 20° C., a heat pump mode with temperatures between 0° C. and 3° C., a heat pump mode with temperatures between −30° C. and 0° C., etc. In various implementations, one or more of the control modes may be implemented at the same time. For instance, the battery cool mode may be implemented with any one of the HVAC modes. In such examples, the battery cool mode may cool to a sufficiently low temperature, such as −10° C. System 100 is not limited to these example control modes, and many other examples and variations are contemplated.

Process 300 then may include "determine whether to use vapor injection into the second stage of the compressor" 304, and this may be determined based at least in part on the received control mode. For example, if the control mode is one of a cabin cooling mode with or without reheat, a cabin cooling mode with high load battery cooling, or a heat pump mode with temperatures between −20° C. and 0° C., vapor injection may be desired. In other examples, if the control mode is one of a cabin cooling mode with low load battery cooling, a battery cooling mode, a cabin heating mode with temperatures less than 20° C., or a heat pump mode with temperatures between 0° C. and 7° C., vapor injection may or may not be needed.

When vapor injection is to be used, process 300 may include "determine whether to use the bypass" 306, and this operation also may depend on which system mode is going to be used. More particularly as one example, it is determined whether the selected mode will use the chiller. If not, the system may operate without the bypass branch and the bypass valve may remain closed. But when the system mode does use the chiller, then the bypass valve is to be opened. This may occur when a cabin heating mode is to be used (whether or not the coolant loop itself will be used. Other modes mentioned herein (or others not mentioned) may use the chiller as well.

Once it is determined that the chiller is to be used, process 300 may include "determine the bypass ratio" 308. As described above, and at first, the combined stream enthalpy state can be estimated at the outlet of the chiller, and then the bypass ratio can be modulated by an estimated ratio that satisfies the target enthalpy state (vapor saturation or superheated vapor to be suctioned into the first stage port 190). In this case, a predetermined look up table in a memory that may be accessible (or part of) controller 180 may list the appropriate bypass ratio for a certain enthalpy state at the chiller. Otherwise, an actual combined stream enthalpy state may be determined by monitoring the sensors, such as sensor 150 by the first stage port 190, and as mentioned above to then adjust the bypass branch until the saturated vapor enthalpy state is reached. The actual enthalpy state calculation may be performed instead of the estimated determination, or both may be used where the enthalpy state is estimated at first, and then once the system has been running for a minimum start-up duration, then actual calculation are to be used. Many variations are contemplated. Whether by estimated enthalpy state, actual calculated enthalpy state, or some other method, the process 300 may determine the bypass ratio continuously while running the refrigerant system, at intervals, or some other timing as the system 100 is being operated to adjust the bypass ratio as needed to maintain efficient operation of the system 100.

Process 300 may include "run refrigerant system using the bypass ratio" 310. This may involve having the controller 180 receive sensor data and then generate and transmit output signals for controlling the valves in system 100, and by this example, in a mode where refrigerant from the chiller 108 is to be mixed with the bypass vapor from the bypass branch 127 to be suctioned into the first stage port 190, while vapor is injected into the second stage port 192 by the VIHE 110, as explained herein. In this example then, the controller 180 controls at least the expansion valves 120 and 124 to expand the high pressure liquid refrigerant as described above, and controls the valve 122 to flow two-phase refrigerant from the chiller 108 to the accumulator 134. The controller 180 also controls the bypass valve 126 to open and provide vapor from the compressor 102 to the accumulator 134. The bypass valve 126 is a variable valve so that the controller 180 can set the bypass valve to flow a desired amount of bypass vapor according to the determined bypass ratio (whether determined by the estimated or actual calculation) and depending on the expected amount of refrigerant to flow through the chiller. The bypass ratio also may be set by alternatively or additionally varying the flow of the refrigerant from the chiller at valve 122 and/or to the chiller at valve 120. This results in the bypass vapor heating the refrigerant from the chiller to create a saturated vapor (or hotter) suctioned into the first stage port 190. This is performed while controlling the VIHE 110 to inject vapor into the second stage port 192 to reduce the amount of chiller refrigerant needed to be heated by the bypass vapor and in turn, raise the efficiency of the compressor 102 and the system 100.

Although the systems herein are shown and described as including one condenser, one evaporator, one chiller, one VI heat exchanger (VIHE), and/or a particular number of other heat exchangers, it should be appreciated that system 100, or variations thereof, may include multiple condensers, evaporators, chillers, VI heat exchangers, and/or more or less other heat exchangers without departing from the scope of the present disclosure. For example, any one of the systems may include one or more chillers in addition to the chiller 108. In such examples, if a valve (e.g., the valve 122) is employed downstream of the chiller(s), the valve may be coupled to the chiller (e.g., a primary chiller) with the highest capacity of refrigerant out. In these cases, a single bypass branch may be used for more than one chiller or there may be multiple bypasses 127 each for an individual chiller, or some combination of these.

The vapor injection refrigerant systems herein achieve numerous benefits. For example, the vapor injection refrigerant systems achieve higher efficiency and coefficient of performance, increased maximum capacity, and a larger spread between minimum system loads and maximum system loads as compared to conventional refrigerant systems without vapor injection capabilities.

Further, when an outside heat exchanger (e.g., the OHX 116) is employed as an evaporator (e.g., in a heat pump mode), decoupling the saturation pressures of the chiller and the evaporator allows the outside heat exchanger (OHX 116) to run to a lower temperature. As a result, the OHX 116 may operate in lower ambient temperatures, which causes greater temperature deltas for the OHX. The greater temperature deltas may result in increased heat transfer rates and increased vehicle efficiency.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the implementations is described above as having certain features, any one or more of those features described with respect to any implementation of the disclosure can be implemented in and/or combined with features of any of the other implementations, even if that combination is not explicitly described. In other words, the described implementations are not mutually exclusive, and permutations of one or more implementations with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of fluids or information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" or "unit" or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-a-chip (SoC).

The module or controller may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext preprocessor), Scala, Eiffel, Smalltalk, Erlang, Ruby, Flash®, Visual Basic®, Lua, MATLAB, SIMULINK, and Python®.

It will be appreciated that the systems, vehicles, and methods may vary from those depicted in the Figures and described herein. For example, the system 100 of FIG. 1 and vehicle of FIG. 2, and any of the components of FIG. 1 may differ from that depicted in FIG. 1. It will similarly be appreciated that the operations of process 300 may differ from those depicted in FIG. 3, and/or that various operations of process 300 may occur concurrently and/or in a different order than that depicted in FIG. 3.

While at least one example implementation has been presented in the foregoing detailed description, it should be appreciated that a vast number of variations exist. It should also be appreciated that the example implementation or example implementations are only examples, and are not intended to limit the scope, applicability, or configuration of the disclosure in any way. Rather, the foregoing detailed description will provide those skilled in the art with a convenient road map for implementing the example implementation or example implementations. It should be understood that various changes can be made in the function and arrangement of elements without departing from the scope of the disclosure as set forth in the appended claims and the legal equivalents thereof.

What is claimed is:

1. A vapor injection refrigerant system, comprising:
   a compressor including at least a first stage input, a second stage input, and an output arranged to provide an output vapor refrigerant;
   a condenser fluidly coupled to the output of the compressor to receive the output vapor refrigerant;
   an evaporator fluidly coupled between the condenser and the first stage input, wherein the evaporator is arranged to provide refrigerant in vapor form to the first stage input of the compressor;
   a chiller fluidly coupled between the condenser and the first and second stage inputs, wherein the chiller is arranged to inject refrigerant in vapor form into the first stage input or the second stage input;

a bypass branch fluidly coupling the output of the compressor to the first stage input of the compressor to provide at least some of the output vapor refrigerant to the first stage input without routing through the condenser, evaporator, and chiller;

a heat exchanger coupled between the condenser and the second stage input of the compressor to provide injected vapor to the second stage input; and at least one valve selectively coupling the chiller to the second stage input so that vapor originating from refrigerant from the chiller merges with vapor from the heat exchanger before entering the second stage input.

2. The system of claim 1, wherein the bypass branch fluidly couples the output of the compressor to an outlet of the evaporator or an outlet of the chiller or both, and wherein the bypass branch is arranged to mix the output vapor refrigerant with refrigerant from the evaporator or chiller or both to form a first stage vapor provided to the first stage input of the compressor.

3. The system of claim 2, comprising at least one valve fluidly controlling the bypass branch to selectively mix the output vapor refrigerant in the bypass branch with the refrigerant from the evaporator, the chiller, or both.

4. The system of claim 1, comprising an accumulator at a merge of the bypass branch with a coupling to the chiller and a coupling to the evaporator.

5. The system of claim 1, wherein the heat exchanger has an intermediate pressure side and a high pressure side, wherein the intermediate pressure side is coupled to the second stage input, and wherein the high pressure side is coupled to the chiller or the evaporator or both.

6. The system of claim 5, comprising an expansion control valve upstream from the intermediate pressure side and fluidly coupled to the condenser, and wherein the high pressure side is not fluidly coupled to an expansion control valve between an inlet of the heat exchanger and the condenser.

7. The system of claim 5, wherein the intermediate pressure side of the heat exchanger provides vapor at an intermediate pressure greater than a suction pressure at the first stage input and less than a pressure of the output vapor refrigerant at the output of the compressor.

8. The system of claim 5, wherein the high pressure side of the heat exchanger is coupled to the evaporator and the chiller to provide sub-cooled refrigerant to the evaporator or chiller or both.

9. The vapor injection refrigerant system of claim 1, wherein the heat exchanger comprises a first pressure side generating vapor of the first pressure and adjacent a third pressure side of the heat exchanger that receives liquid of a third pressure from the condenser; and a shut-off valve between the first pressure side and the condenser available to selectively block refrigerant flow to the first pressure side without blocking refrigerant flow to the third pressure side.

10. The vapor injection refrigerant system of claim 1, comprising an outside heat exchanger connected between the compressor output and an accumulator in a reverse mode, wherein the outside heat exchanger is arranged to receive ambient air external to the vehicle as a heat source in the reverse mode.

11. A vehicle comprising a refrigerant system, the refrigerant system comprising:

a compressor including at least a first stage input, a second stage input, and an output arranged to provide an output vapor refrigerant;

a condenser fluidly coupled to the output of the compressor to receive the output vapor refrigerant;

an evaporator fluidly coupled between the condenser and the first stage input, wherein the evaporator is arranged to provide refrigerant in vapor form to the first stage input of the compressor;

a chiller fluidly coupled between the condenser and both the first and second stage inputs, wherein the chiller is arranged to inject refrigerant in vapor form into the first stage input or the second stage input;

an accumulator fluidly coupled between the first stage input and both the chiller and the evaporator; and a bypass branch fluidly coupling the output of the compressor to the accumulator; and an outside heat exchanger with a forward mode during a cooling operation, wherein the heat exchanger operates as a condenser in a forward mode and as an evaporator in a reverse mode; and wherein in the reverse mode, at least part of the bypass branch forms at least part of a fluid passage to the accumulator.

12. The vehicle of claim 11, wherein the system comprises a bypass ratio of an amount of bypass vapor to be passed through the bypass branch given an amount of refrigerant from the chiller to be heated by the bypass vapor; a bypass valve controlling flow of refrigerant through the bypass branch; and at least one processor communicatively coupled to the bypass valve and that uses the bypass ratio to control the bypass valve to control flow of refrigerant through the valve.

13. The vehicle of claim 12, wherein the bypass ratio is set to attempt to provide a combined stream enthalpy state for the system that is as close to a saturated vapor state as possible, wherein a combined stream extends from the accumulator to the first stage input.

14. The vehicle of claim 11, comprising one or more sensors on the system arranged to detect temperature and pressure of the refrigerant in the system; a bypass valve along the bypass branch and coupled between the output of the compressor and the accumulator; and at least one processor communicatively coupled to the bypass valve and arranged to operate the bypass valve depending on a bypass ratio set by monitoring the one or more sensors.

15. The vehicle of claim 11, wherein the bypass branch fluidly couples the output of the compressor to an outlet of the evaporator or an outlet of the chiller or both, and wherein the bypass branch is arranged to mix the output vapor refrigerant with refrigerant from the evaporator or chiller or both to form a first stage vapor provided to the first stage input of the compressor.

16. A heating and cooling system on a vehicle, comprising:

a compressor including a first stage input, a second stage input, and an output arranged to provide an output vapor refrigerant;

a condenser fluidly coupled to the output of the compressor to receive the output vapor refrigerant;

an evaporator fluidly coupled between the condenser and the first stage input, wherein the evaporator is arranged to provide refrigerant in vapor form to the first stage input of the compressor;

a chiller fluidly coupled between the condenser and the first stage input to provide a two-phase refrigerant;

an accumulator fluidly coupled between the first stage input and the chiller to receive the two-phase refrigerant; and a bypass branch fluidly coupling the output of the compressor to the accumulator to heat the two-phase refrigerant; and a heat exchanger having an expansion control valve and being between the condenser and the second stage input to inject vapor into the second stage input at a first pressure higher than a second pressure of vapor entering the first stage input;

a pressure and temperature sensor coupled between the first stage input and the accumulator; and at least one processor receiving signals from the sensor and used to determine an amount of refrigerant to flow through the bypass.

17. The system of claim 16, wherein the heat exchanger is fluidly positioned between the condenser and the chiller to divert refrigerant to the second stage input and away from the chiller.

18. The system of claim 16, comprising an outside heat exchanger connected between the compressor output and an accumulator in a reverse mode, wherein the outside heat exchanger is arranged to receive ambient air external to the vehicle as a heat source in the reverse mode.

19. The vehicle of claim 16, wherein the heat exchanger comprises a first pressure side generating vapor of the first pressure and adjacent a third pressure side of the heat exchanger that receives liquid of a third pressure from the condenser; and a shut-off valve between the first pressure side and the condenser available to selectively block refrigerant flow to the first pressure side without blocking refrigerant flow to the third pressure side.

20. The heating and cooling system of claim 16, wherein the heat exchanger has an intermediate pressure side and a high pressure side, wherein the intermediate pressure side is coupled to the second stage input, and wherein the high pressure side is coupled to the chiller or the evaporator or both.

* * * * *